United States Patent
Giannopoulos et al.

(10) Patent No.: US 6,674,655 B2
(45) Date of Patent: Jan. 6, 2004

(54) CONTROL METHOD AND APPARATUS FOR A FLYBACK CONVERTER

(75) Inventors: Demetri Giannopoulos, Norwalk, CT (US); Nai-Chi Lee, Peekskill, NY (US); Qiong Li, Cortlandt Manor, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 62 days.

(21) Appl. No.: 09/752,144

(22) Filed: Dec. 29, 2000

(65) Prior Publication Data

US 2002/0085394 A1 Jul. 4, 2002

(51) Int. Cl.[7] .............................................. H02M 3/335
(52) U.S. Cl. ..................... 363/21.01; 363/97; 363/21.12
(58) Field of Search ............................. 363/15, 16, 20, 363/21.12, 97, 131, 21.01

(56) References Cited

U.S. PATENT DOCUMENTS

| | | | | |
|---|---|---|---|---|
| 4,683,529 A | * | 7/1987 | Bucher, II | ................... 363/44 |
| 5,734,564 A | | 3/1998 | Brkovic | ........................ 363/21 |
| 6,018,469 A | * | 1/2000 | Poon | ........................... 363/131 |
| 6,097,614 A | * | 8/2000 | Jain et al. | ...................... 363/16 |
| 6,304,473 B1 | * | 10/2001 | Telefus et al. | ................. 363/97 |
| 6,341,073 B1 | * | 1/2002 | Lee | ........................... 363/21.02 |
| 6,344,983 B1 | * | 2/2002 | Glennon | ................... 363/21.01 |
| 6,370,045 B1 | * | 4/2002 | Lurkens | ...................... 323/299 |

* cited by examiner

Primary Examiner—Michael Sherry
Assistant Examiner—Gary L. Laxton
(74) Attorney, Agent, or Firm—Aaron Waxler

(57) ABSTRACT

A power supply comprising a flyback converter and a controller is disclosed. The flyback converter drives a load when electrically coupled to an alternating current power source. The controller controls a soft switching during each switching time period of the flyback converter. Upon an initial switching time period, the controller determines each acceptable switching frequency for the subsequent switching time periods and selects one of the acceptable switching frequencies for soft switching the flyback converter over one or more switching time periods during a constant load.

20 Claims, 6 Drawing Sheets

CONTROL METHOD AND APPARATUS FOR A FLYBACK CONVERTER

BACKGROUND OF THE INVENTION

1. Field of the Invention

The present invention generally relates to power supplies for electronic devices, e.g., televisions, desktop computers, computer monitors, laptop computers, compact disc players, digital video disc players, and audio components such as receivers and tuners. The present invention specifically relates to a method and apparatus for controlling a soft switching of a switch of a flyback converter.

2. Description of the Related Art

A typical flyback converter includes a metal-oxide semiconductor field-effect transistor switch ("MOSFET switch") that is selectively turned on and off in view of regulating an output voltage of the flyback converter. Specifically, the MOSFET switch is transitioned from an OFF state to an ON state at one of the valleys of a drain voltage of the MOSFET switch in view of an output power being transmitted by the flyback converter to a load. First valley switching occurs when the output power is within an upper end of a load range of the flyback converter. Referring to FIG. 1A, a gate voltage $V_{G1}$ Of the MOSFET switch transitions from a voltage off level $V_{OFF}$ to a voltage on level $V_{ON}$ when a first valley of a drain voltage $V_{D1}$ is detected. An off-time period $T_{OFF(HL)}$ corresponds to an acceptable switching frequency for the flyback converter when the output power is within an upper end of the load range.

High order valley switching occurs when the output power is within an intermediate portion or a lower end of the load range of the flyback converter. Referring to FIG. 1B, a minimum off-time period $T_{OFF(MIN)}$ that extends beyond a first valley and a second valley of drain voltage $V_{D1}$ is determined, and gate voltage $V_{G1}$ transitions from voltage off level $V_{OFF}$ to voltage on level $V_{ON}$ upon a first detection of a third valley of a drain voltage $V_{D1}$ after an elapse of minimum off-time $T_{OFF(MIN)}$. An off-time period $T_{OFF(IL/LL)}$ corresponds to an acceptable switching frequency for the flyback converter when the output power is within the intermediate portion or the lower end of the load range.

The first valley switching as shown in FIG. 1A and the high order valley switching as shown in FIG. 1B is predicated upon a selection of a specific valley of drain voltage $V_{D1}$ for transitioning gate voltage $V_{G1}$ from voltage off level $V_{OFF}$ to voltage on level $V_{ON}$. However, this predication fails to recognize that two or more valleys of drain voltage $V_{D1}$ may correspond to acceptable switching frequencies for drain voltage $V_{D1}$. This predication also fails to incorporate other performance parameters of the flyback converter such as an efficient power operation of the flyback converter. The electronic industry is therefore striving to improve upon a control of a soft switching of the MOSFET switch.

SUMMARY OF THE INVENTION

The present invention relates to a control of a soft switching of a switch of a flyback converter. Various aspects of the invention are novel, non-obvious, and provide various advantages. While the actual nature of the present invention covered herein can only be determined with reference to the claims appended hereto, certain features, which are characteristic of the embodiments disclosed herein, are described briefly as follows.

A first form of the present invention is a power supply comprising a flyback converter including a switch operable to be switched between an on state and an off state. The power supply further comprises a controller that is operable during a first switching time period to determine at least one soft switching frequency for transitioning the switch from the off state to the on state during a second switching time period. The second switching time period is subsequent to the first switching time period.

A second form of the present invention is a power supply comprising a flyback converter including a switch having a gate terminal, a drain terminal, and a source terminal. The power supply further comprises a controller electrically coupled to said gate terminal and said drain terminal. The controller is operable to provide a gate voltage to the gate terminal in response to a drain voltage at the drain terminal.

The foregoing forms and other forms, features and advantages of the present invention will become further apparent from the following detailed description of the presently preferred embodiments, read in conjunction with the accompanying drawings. The detailed description and drawings are merely illustrative of the present invention rather than limiting, the scope of the present invention being defined by the appended claims and equivalents thereof.

DETAILED DESCRIPTION OF THE PRESENTLY PREFERRED EMBODIMENTS

Figure 1A:
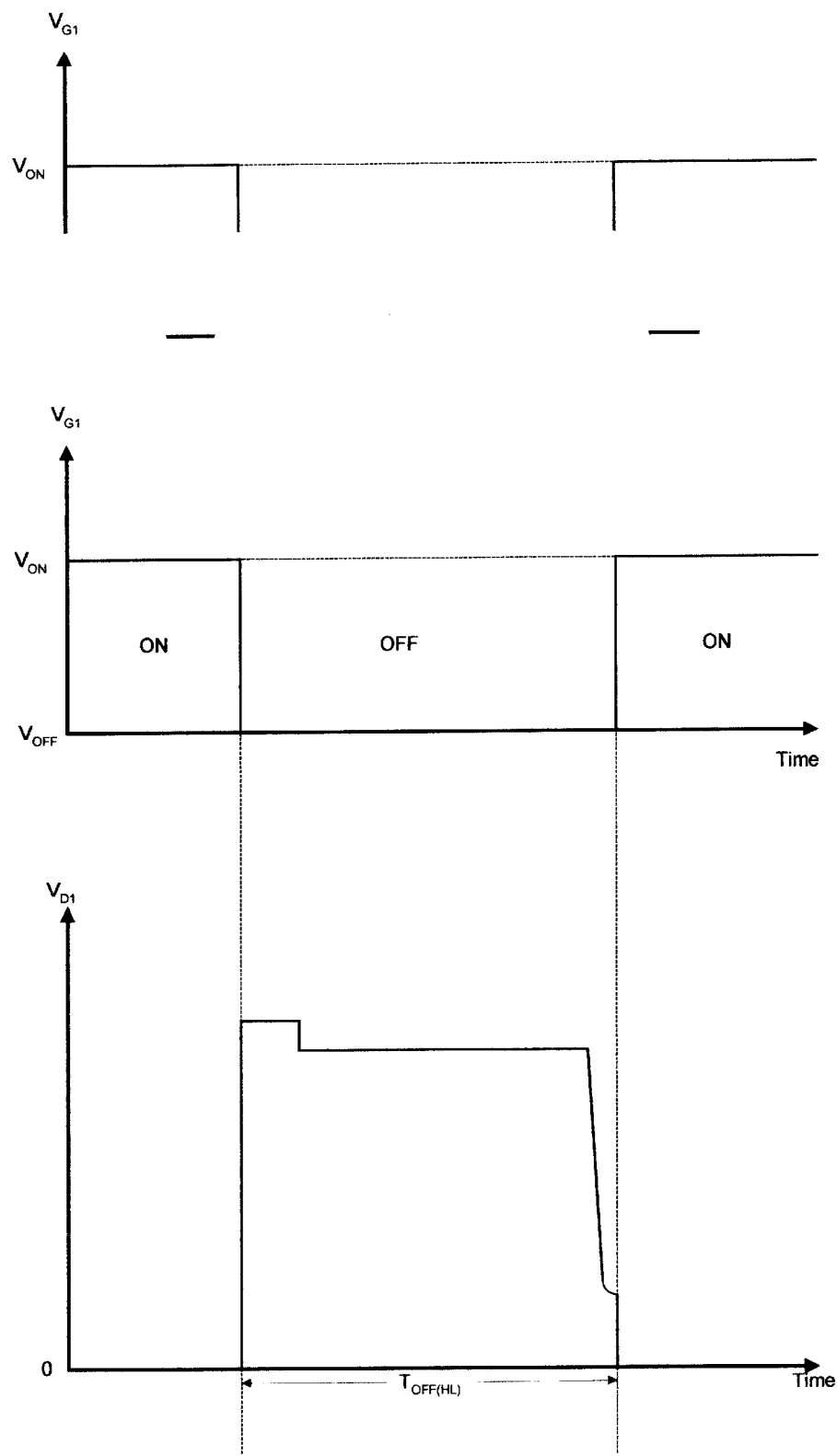
FIG. 1A is a first exemplary illustration of a prior art gate voltage waveform and a prior art drain voltage waveform of a MOSFET switch of a flyback converter under a high load.
Figure 1B:
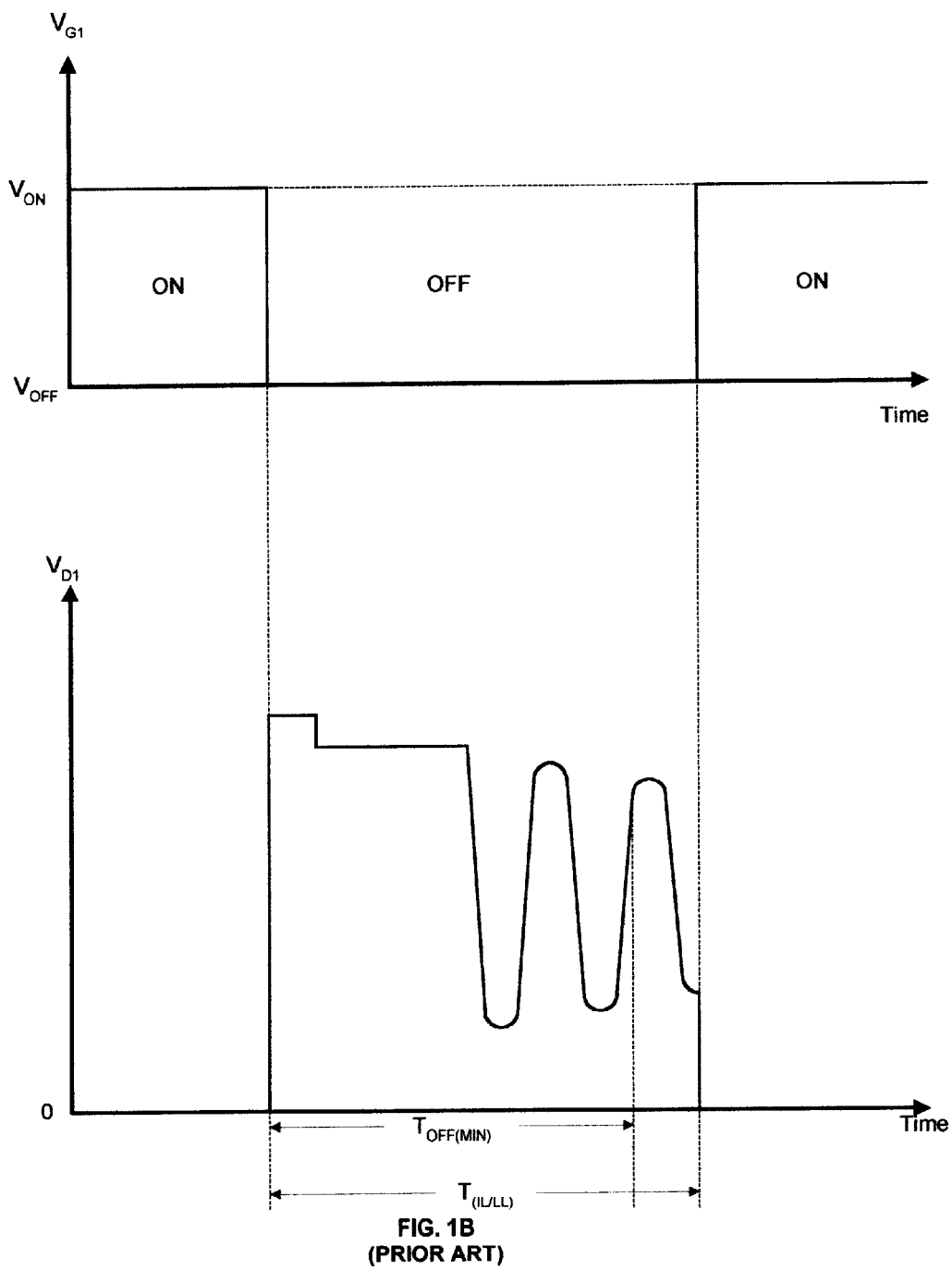
FIG. 1B is a second exemplary illustration of a prior art gate voltage waveform and a prior art drain voltage waveform of a MOSFET switch of a flyback converter under an intermediate load or a light load.
Figure 2:
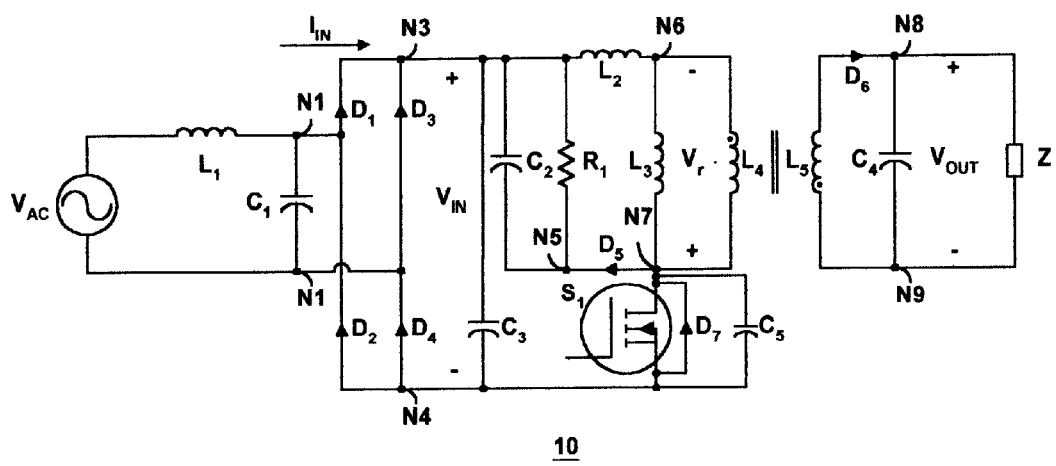
FIG. 2 is a schematic diagram of one embodiment of a flyback converter in accordance with the present invention.

Referring to FIG. 2, a flyback converter 10 as coupled to an alternating voltage source $V_{AC}$, e.g. a wall outlet, is shown. Flyback converter 10 includes an inductor L1 and a capacitor C1. Inductor L1 is electrically coupled to alternating voltage source $V_{AC}$ and a node N1. Capacitor C1 is electrically coupled to node N1 and a node N2. Alternating voltage source $V_{AC}$ is also electrically coupled to node N2.

Flyback converter 10 further includes a diode D1, a diode D2, a diode D3, and a diode D4. Diode D1 is electrically coupled to node N1 and a node N3. Diode D2 is electrically coupled to node N2 and a node N4. Diode D3 is electrically coupled to node N2 and node N3. Diode D4 is electrically coupled to node N2 and node N4. An input voltage $V_{IN}$ is applied between node N3 and node N4, and an input current $I_{IN}$ flows into node N3.

Flyback converter 10 further includes a capacitor C2, a capacitor C3, a resistor R1, a diode D5, and a transformer having an inductor L2, an inductor L3, an inductor L4 and an inductor L5. Capacitor C2 is electrically coupled to node N3 and a node N5. Capacitor C3 is electrically coupled to node N3 and node N4. Resistor R1 is electrically coupled to node N3 and node N5. Inductor L2 is electrically coupled to node N3 and a node N6. Diode D5 is electrically coupled to node N5 and a node N7. In ductor L3 is electrically coupled to node N6 and node N7. Inductor L4 is electrically coupled to node N6 and node N7. A reflected secondary voltage $V_{RS}$ is applied between node N6 and node N7.

Flyback converter 10 further includes a diode D6, and a capacitor C4. Inductor L5 is electrically coupled to diode D6 and a node N9. Diode D6 is also electrically coupled to a node N8. Capacitor C4 is electrically coupled to node N8 and node N9. An output voltage $V_{OUT}$ is applied between node N8 and node N9. A load Z can be applied to flyback converter 10 between node N8 and node N9.

Flyback converter 10 further includes a MOSFET switch S1, a diode D7, and a capacitor C5. MOSFET switch S1 has a drain terminal electrically coupled to node N7 and a source terminal electrically coupled to node N4. In other embodiments of a flyback converter in accordance with the present invention, other types of switches may be substituted from MOSFET switch S1 as would occur to those with ordinary skill in the art. Diode D7 and capacitor C5 are electrically coupled to node N7 and node N4.

Figure 3:
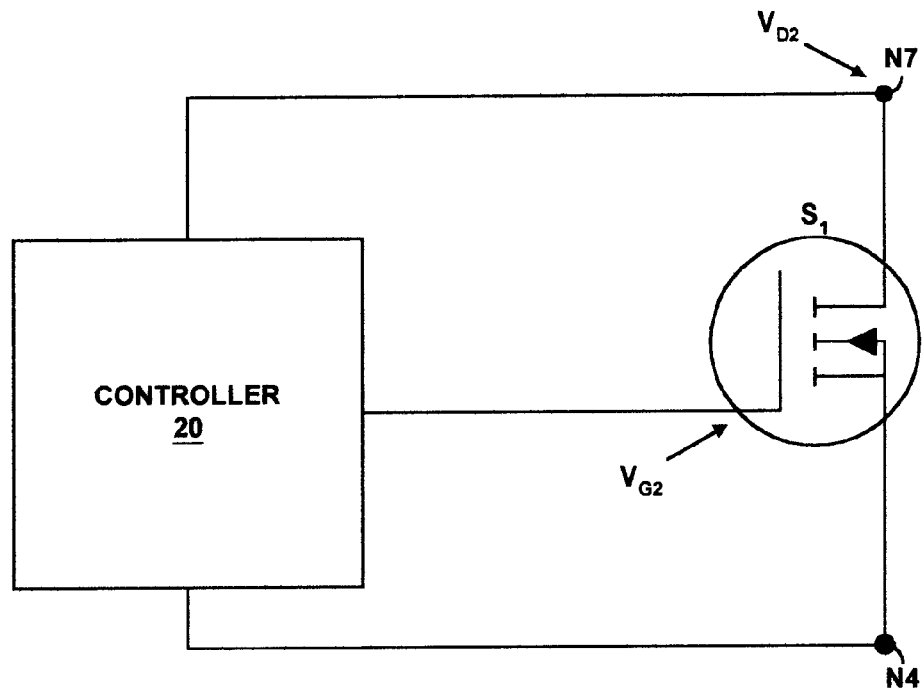
FIG. 3 is a block diagram of one embodiment of a controller in accordance with the present invention.

Referring additionally to FIG. 3, a controller 20 is electrically coupled to a gate terminal of MOSFET switch S1, node 4, and node N7 to control a soft switching of MOSET switch S1. Controller 20 is preferably an electronic circuit comprised of one or more components that are assembled as a common unit. Alternatively, for the multiple component embodiments, one or more of these components may be distributed throughout a power supply system comprising flyback converter 10 and controller 20. Controller 20 may be comprised of digital circuitry, analog circuitry, or both. Also, controller 20 may be programmable, a dedicated state machine, or a hybrid combination of programmable and dedicated hardware.

It is preferred that controller 20 include an integrated processing unit (not shown) operatively coupled to one or more solid-state memory devices (not shown). It is also preferred that this memory contain programming corresponding to a valley switching acceptance routine 30 (FIG. 5) and that this memory be arranged for reading and writing of data in accordance with the principles of the present invention. The memory may be either volatile or nonvolatile and may additionally or alternatively be of the magnetic or optical variety.

To implement the principles of the present invention, controller 20 can further include any control clocks, interfaces, signal conditioners, filters, Analog-to Digital (A/D) converters, Digital-to-Analog (D/A) converters, communication ports, or other types of operators as would occur to those having ordinary skill in the art.

Figure 4:
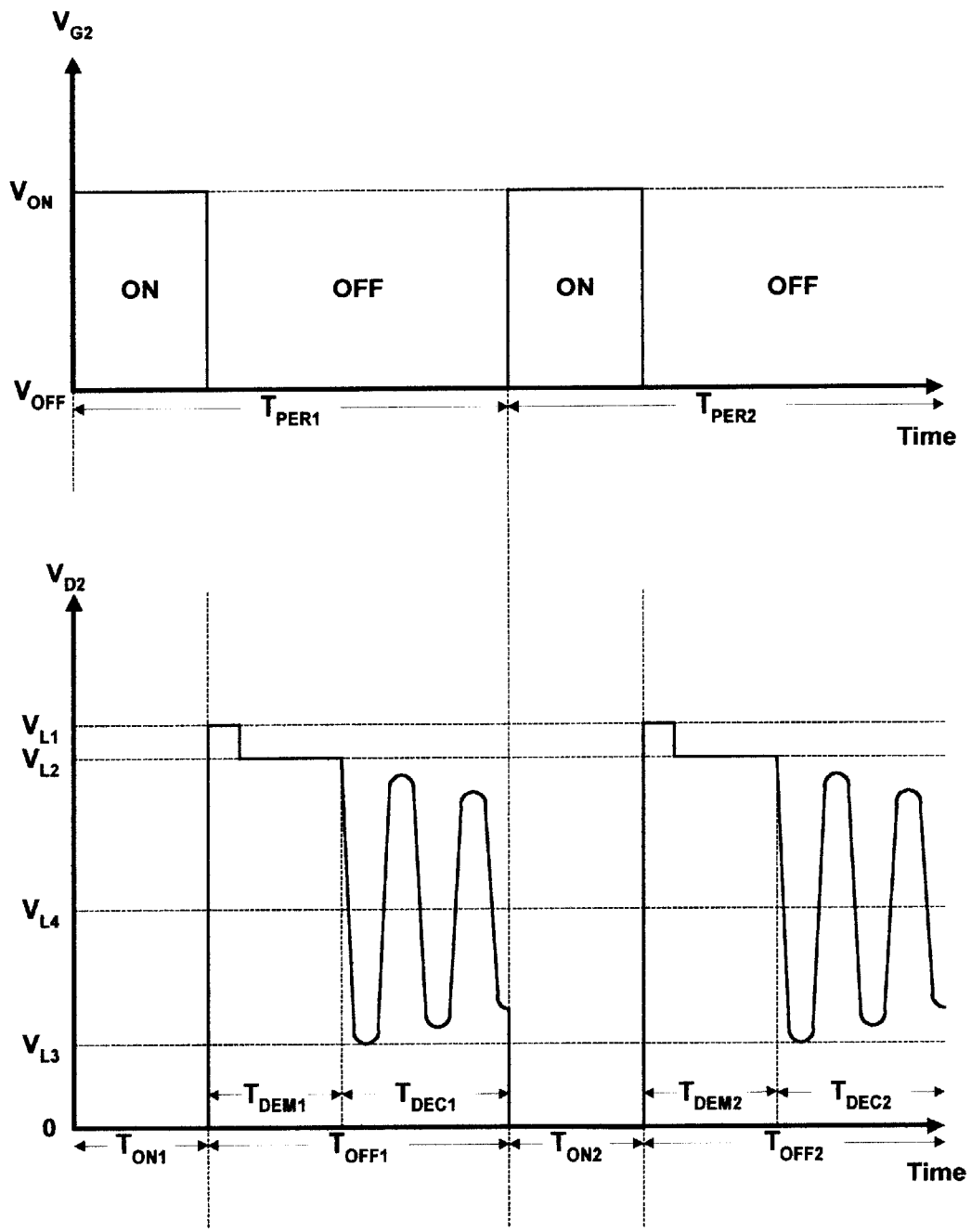
FIG. 4 is an exemplary illustration of a first switching time period and a second switching time period of a gate voltage waveform and a drain voltage waveform of a MOSFET switch of the FIG. 2 flyback converter.

Referring additionally to FIG. 4, a switching time period $T_{PER1}$ and a switching time period $T_{PER2}$ of gate voltage $V_{G2}$ and drain voltage $V_{D2}$ are shown. Three valleys of drain voltage $V_{D2}$ are shown during switching time period $T_{PER1}$ and during switching time period $T_{PER2}$ for facilitating a description of a valley switching acceptance routine 30 (FIG. 5).

During an on-time period $T_{ON1}$ of switching time period $T_{PER1}$, gate voltage $V_{G2}$ equates voltage on level $V_{ON}$ and drain voltage $V_{D2}$ equates a zero voltage level. During an off-time period $T_{OFF1}$ of switching time period $T_{PER1}$, gate voltage $V_{G2}$ equates a voltage off level $V_{OFF}$. During a demagnetization period $T_{DEM1}$ of switching time period $T_{PER1}$, drain voltage $V_{D2}$ initially equates a voltage level $V_{L1}$ which is a summation of input voltage $V_{IN}$, reflected secondary voltage $V_R$ and an overshoot voltage $V_{OS}$. Overshoot voltage $V_{OS}$ dissipates and drain voltage $V_{D2}$ thereafter equates a voltage level $V_{L2}$ that is summation of input voltage $V_{IN}$ and reflected secondary voltage $V_R$.

During a decaying time period $T_{DEC1}$ of switching time period $T_{PER1}$, drain voltage $V_{D2}$ resonates as a function of inductor L3 and capacitor C5. Drain voltage $V_{D2}$ further decays between voltage level $V_{L2}$ and a voltage level $V_{L3}$ toward a voltage level $V_{L4}$. Voltage level $V_{L3}$ is a differential of input voltage $V_{IN}$ and reflected secondary voltage $V_R$ and voltage level $V_{L4}$ approximates input voltage $V_{IN}$. Decaying period $T_{DEC1}$ is terminated upon a transitioning of gate voltage $V_{G2}$ from voltage off level $V_{OFF}$ to voltage on level $V_{ON}$ at one of the valleys of drain voltage $V_{D2}$, such as, for example, a third valley of drain voltage $V_{D2}$ as shown.

Figure 5:
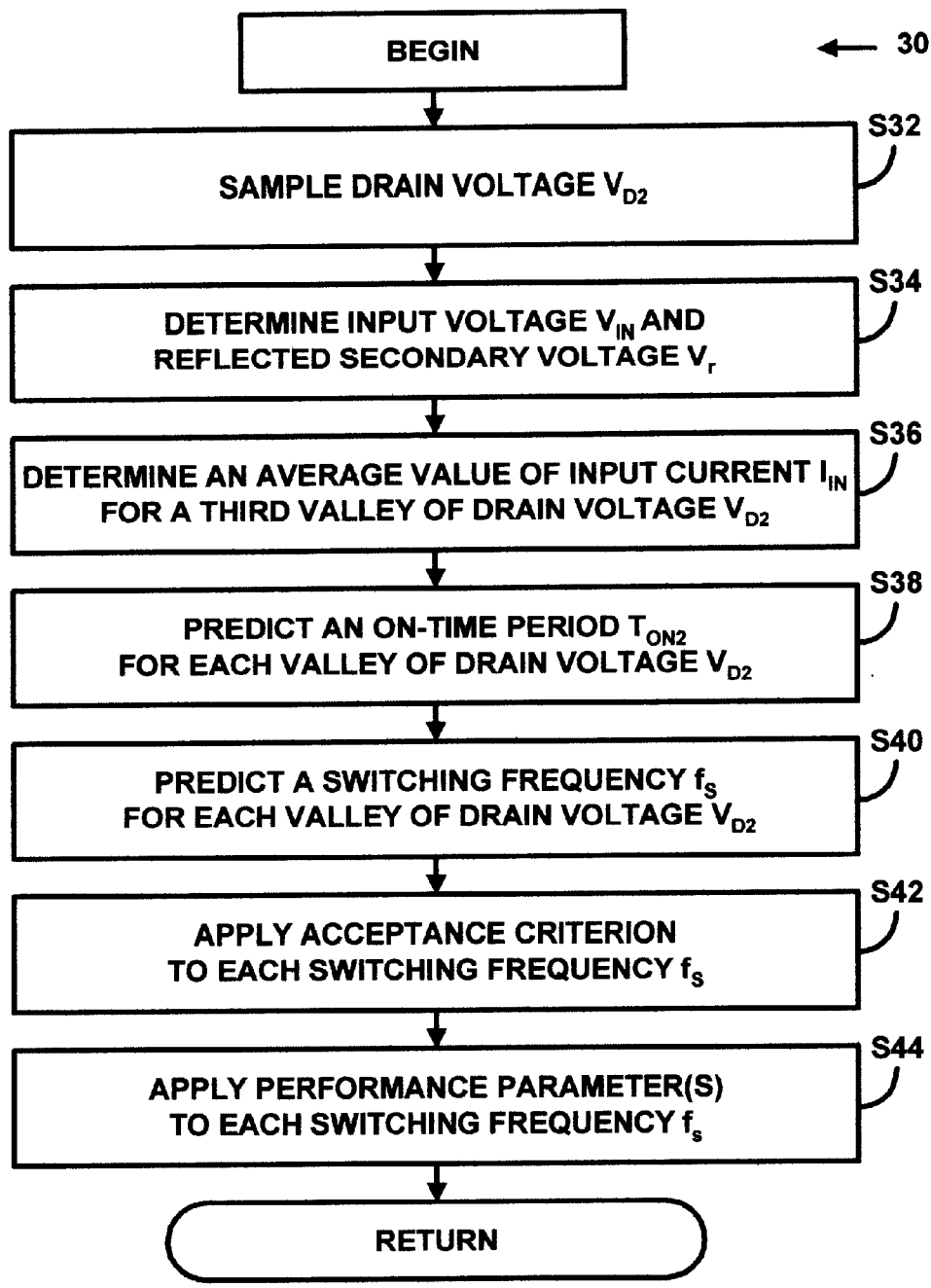
FIG. 5 is a flow diagram of one embodiment of a valley switching acceptance routine in accordance with the present invention.

Referring additionally to FIG. 5, a valley switching acceptance routine 30 is shown. Controller 20 implements a stage S32, a stage S34 and a stage S36 of routine 30 during switching time period $T_{PER1}$. Controller 20 implements a stage S38, a stage S40 and a stage S42 of routine 30 during an on-time time period $T_{ON2}$. Controller 20 implements a stage S44 of routine 30 from an off-time period $T_{OFF2}$ and may continue an implementation of stage S44 over one or more subsequent switching time periods. In stage 344, performance parameters, e.g., input power, peak primary current, etc. are applied to each switching frequency $f_s$.

During a stage S32 of routine 30, controller 20 samples drain voltage $V_{D2}$ over switching time period $T_{PER1}$. As a result, demagnetization period $T_{DEM1}$ is measured and drain voltage $V_{D2}$ during demagnetization period $T_{DEM1}$ is measured.

During a stage S34 of routine 30, controller 20 determines input voltage $V_{IN}$ and reflected secondary voltage $V_r$ during switching time period $T_{PER1}$. In one embodiment, input voltage $V_{IN}$ and reflected secondary voltage $V_r$ are computed from the following equations (1) and (2):

$$T_{DEM1}=T_{ON1}(V_{IN}/V_r) \quad (1)$$

$$V_{D2}=V_{IN}+V_r \quad (2)$$

where controller 20 knows demagnetization period $T_{DEM1}$, drain voltage $V_{D2}$, and on-time period $T_{ON1}$.

During a stage S36 of routine 30, controller 20 determines an average value of input current $I_{IN}$ for the third valley of drain voltage $V_{D2}$. In one embodiment, the average value of input current $I_{IN}$ is computed from the following equation (3)

$$I_{IN}=[0.5*T_{ON1}^2*(V_{IN}/L_3)]/[(T_{ON1}*(1+((V_{IN}/V_r))+((n-0.5)*T_{RES})] \quad (3)$$

where n=3 for the third valley switching and a resonance time period $T_{RES}$ is a function of inductor L3 and capacitor C5 as would occur to those with ordinary skill in the art.

In another embodiment, a resistor is electrically coupled in series between the source terminal of MOSFET switch S1 and node N4. Input current $I_{IN}$ is measured over switching time period $T_{PER1}$ as would occur to those with ordinary skill in the art.

During a stage S38 of routine 30, controller 20 predicts on-time period $T_{ON2}$ for the first valley, the second valley and the third valley of drain voltage $V_{D2}$. In one embodiment, on-time period $T_{ON2}$ is computed from the following equation (4):

$$[0.5*(V_{IN}/L_3)*T_{ON1}^2]-[(1+(V_{IN}/V_r))*I_{IN}*T_{ON1}]-[(n-0.5)*T_{RES}*I_{IN}]=0 \quad (4)$$

where the value for $I_{IN}$ is take from stage S36. For the first valley of drain voltage $V_{D2}$, integer n is 1 to obtain an on-time period $T_{ON2(FV)}$. For the second valley of drain voltage $V_{D2}$, integer n is 2 to obtain an on-time period $T_{ON2(SV)}$. For the third valley of drain voltage $V_{D2}$, integer n is 3 to obtain an on-time period $T_{ON2(TV)}$.

During a stage S40 of routine 30, controller 20 computes a switching frequency $f_{S1}$ for a first valley switch during switching time period $T_{PER2}$, a switching frequency $f_{S2}$ for a second valley switch during switching time period $T_{PER2}$, and a switching frequency $f_{S3}$ for a third valley switch during switching time period $T_{PER2}$. In one embodiment, switching frequency $f_{S1}$, switching frequency $f_{S2}$, and switching frequency $f_{S3}$ are computed in accordance with the following equation (5):

$$f_{SN}=1/[(T_{ON2}*(1+((V_{IN}/V_r))+(n-0.5))*T_{RES})] \quad (5)$$

In computing switching frequency $f_{S1}$, integer n is 1 for a first valley switching and $T_{ON2}$ equates $T_{ON2(FV)}$ as previously computed during stage S38. In computing switching frequency $f_{S2}$, integer n is 2 for a second valley switching and $T_{ON2}$ equates $T_{ON2(SV)}$ as previously computed during stage S38. In computing switching frequency $f_{S3}$, integer n is 3 for a third valley switching and $T_{ON2}$ equates $T_{ON2(TV)}$ as previously computed during stage S38.

During a stage S42 of routine 30, an acceptance criterion is applied to switching frequency $f_{S1}$, switching frequency $f_{S2}$ and switching frequency $f_{S3}$. In one embodiment, switching frequency $f_{S1}$, switching frequency $f_{S2}$ and switching frequency $f_{S3}$ are compared to a switching frequency range specification for flyback converter 10. Switching frequency $f_{S1}$ is deemed acceptable if switching frequency $f_{S1}$ is within the switching frequency range specification. Switching frequency $f_{S2}$ is deemed acceptable if switching frequency $f_{S2}$ is within the switching frequency range specification. Switching frequency $f_{S3}$ is deemed acceptable if switching frequency $f_{S3}$ is within the switching frequency range specification.

During an optional stage S44 of routine 30, one or more performance parameters are applied to each switching frequency accepted during stage S42. Controller 20 implements stage S44 when two or more switching frequencies are deemed acceptable during stage S42. In one embodiment, an input power $P_{IN}$ is computed for each accepted switching frequency and the switching frequency having the lowest input power $P_{IN}$ is selected as the switching frequency for subsequent switching time periods as long as the load Z remains constant. For example, when switching frequency $f_{S1}$, switching frequency $f_{S2}$ and switching frequency $f_{S3}$ are all accepted during stage S42, a corresponding input power $P_{IN}$ is computed in accordance with the following equations (6) and (7):

$$P_{IN(n)}=V_{IN}*I_{IN(n)} \quad (6)$$

$$I_{IN(n)}=f_{S(n)}*0.5*(V_{IN}/L_3)*T_{ON}^2 \quad (7)$$

Where $T_{ON}$ represents a measured value of during a current switching time period. The switching frequency corresponding to the lowest computed $P_{IN(n)}$ is tested during subsequent switching time periods and is utilized for soft switching if the testing verifies the computed $P_{IN(n)}$.

While the embodiments of the present invention disclosed herein are presently considered to be preferred, various changes and modifications can be made without departing from the spirit and scope of the present invention. The scope of the present invention is indicated in the appended claims, and all changes that come within the meaning and range of equivalents are intended to be embraced therein.

What is claimed is:

1. A power supply comprising:
    a flyback converter including a switch operable to be switched between an on state and an off state; and
    a controller operable during a first switching time period to determine at least two soft switching frequencies, each being acceptable by a switching frequency range specification, for transitioning said switch from said off state to said on state during a second switching time period subsequent to said first switching time period, and to select one soft switching frequency from said at least two soft switching frequencies by applying at least one performance parameter.

2. The power supply system of claim 1, wherein said switch is a metal-oxide semiconductor field-effect transistor.

3. The power supply system of claim 1, wherein said at least one performance parameter comprises an input power.

4. The power supply system of claim 3, wherein said one selected soft switching frequency has a minimum input power.

5. A power supply, comprising:
    a flyback converter operative within a selected range of frequencies and including a switch having a gate terminal, a drain terminal, and a source terminal; and
    a controller electrically coupled to said gate terminal and said drain terminal, said controller operable to provide a gate voltage to said gate terminal in response to a drain voltage at said drain terminal;
    wherein said controller is operable during a first switching time period to determine at least two soft switching frequencies, each corresponding to a valley of a drain voltage and acceptable by a switching frequency range specification, for transitioning said switch from an off state to an on state during a second switching time period, and to select one soft switching frequency from said at least two soft switching frequencies by applying at least one performance parameter.

6. The power supply of claim 5, wherein said flyback converter further includes a diode electrically coupled to said drain terminal and said source terminal.

7. The power supply of claim 5, wherein said flyback converter further includes a capacitor electrically coupled to said drain terminal and said source terminal.

8. The power supply of claim 5, further comprising:
    a resistor electrically coupled to said source terminal.

9. The power supply of claim 5, wherein said switch is a metal-oxide semiconductor field-effect transistor.

10. The power supply of claim 5, wherein said controller is further operable to sample said drain voltage.

11. The power supply of claim 5, wherein said controller is further operable to determine an input voltage to said flyback converter in response to said drain voltage.

12. The power supply of claim 5, wherein said at least one performance parameter comprises an input power.

13. The power supply of claim 12, wherein said selected one soft switching frequency has a minimum input power.

14. A method for soft switching a switch of a flyback converter, comprising:
    a first switching time period;
    determining at least two soft switching frequencies, each being acceptable by a switching frequency range specification, for transitioning said switch from an off state to an on state during a second switching time period subsequent to said first switching time period, and selecting one soft switching frequency from said at least two soft switching frequencies by applying at least one performance parameter.

15. The method of claim 14, further comprising:

sampling a drain voltage of the switch; and determining an input voltage and a reflected secondary voltage of the flyback converter as a function of said sampling of said drain voltage.

16. The method of claim 15, further comprising:

determining an average value of an input current of the flyback converter for a switching valley of the drain voltage during a first switching time period.

17. The method of claim 16, further comprising:

predicting an on time period of the second switching time period for the switch for a plurality of switching valleys of the drain voltage.

18. The method of claim 17, further comprising:

predicting a switching frequency for each of said plurality of switching valleys of the drain voltage during said second switching time period.

19. The method of claim 18, wherein said at least one performance parameter comprises an input power.

20. The method of claim 19, wherein said one selected soft switching frequency has a minimum input power.

* * * * *